United States Patent
Wang et al.

(10) Patent No.: US 11,510,073 B2
(45) Date of Patent: Nov. 22, 2022

(54) MOBILITY BACKHAUL BANDWIDTH ON DEMAND

(71) Applicant: AT&T Intellectual Property I, L.P., Atlanta, GA (US)

(72) Inventors: Dongmei Wang, Basking Ridge, NJ (US); Weiyi Zhang, Edison, NJ (US); Sarat Puthenpura, Berkeley Heights, NJ (US); Kostas Oikonomou, Colts Neck, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 76 days.

(21) Appl. No.: 17/078,398

(22) Filed: Oct. 23, 2020

(65) Prior Publication Data
US 2022/0132329 A1   Apr. 28, 2022

(51) Int. Cl.
*H04W 24/02* (2009.01)
*H04W 88/14* (2009.01)
(Continued)

(52) U.S. Cl.
CPC ........... *H04W 24/02* (2013.01); *H04W 24/08* (2013.01); *H04W 28/0942* (2020.05); *H04W 88/14* (2013.01)

(58) Field of Classification Search
CPC . H04W 24/02; H04W 28/0942; H04W 24/08; H04W 88/14; H04W 72/0486; H04W 72/0493
See application file for complete search history.

(56) References Cited

U.S. PATENT DOCUMENTS 6,744,767 B1 *  6/2004  Chiu ................ H04L 47/521
                                                370/231
6,795,399 B1 *  9/2004  Benmohamed ......... H04L 47/10
                                                370/255
(Continued)

FOREIGN PATENT DOCUMENTS

WO    WO-2016075693 A1 *  5/2016  ............ H04M 15/41

OTHER PUBLICATIONS

Frisanco et al. "Infrastructure Sharing and Shared Operations for Mobile Network Operators", IEEE, Proc. IEEE Netw. Operat. Manage. Symp. (NOMS), pp. 129-136, 2008 (Year: 2008).*

*Primary Examiner* — Shah M Rahman
(74) *Attorney, Agent, or Firm* — Guntin & Gust, PLC; John G. Rauch

(57) ABSTRACT

Aspects of the subject disclosure may include, for example, monitoring communication traffic in a communication network including a plurality of cell sites and a plurality of collector circuits over a time period, storing information about the communication traffic and information about available network resources in a database and predicting where additional capacity will be needed in the communication network at a future time, wherein the predicting is based on the information about the communication traffic. The subject disclosure may further include improving assignment of additional capacity in the communication network between the plurality of cell sites and the plurality of collector circuits based on the information about available network resources and communicating with network switches to assign the additional capacity within the communication network and initiate communication in the communication network. Other embodiments are disclosed.

20 Claims, 10 Drawing Sheets

(51) Int. Cl.
*H04W 24/08* (2009.01)
*H04W 28/08* (2009.01)

(56) References Cited

U.S. PATENT DOCUMENTS

| | | | |
|---|---|---|---|
| 7,475,130 B2* | 1/2009 | Silverman | H04L 43/08 |
| | | | 709/224 |
| 9,391,993 B1* | 7/2016 | Winer | G06Q 50/01 |
| 9,756,518 B1* | 9/2017 | Sheen | H04W 16/18 |
| 10,326,532 B2* | 6/2019 | Ashrafi | G06F 9/45558 |
| 2003/0027523 A1* | 2/2003 | Lim | H04B 7/1858 |
| | | | 455/454 |
| 2010/0014441 A1* | 1/2010 | Middleton-Hand | G06Q 10/06 |
| | | | 370/254 |
| 2012/0064908 A1* | 3/2012 | Fox | H04L 12/1489 |
| | | | 455/452.2 |
| 2013/0159513 A1* | 6/2013 | Hayashi | H04L 43/0817 |
| | | | 709/224 |
| 2014/0045438 A1* | 2/2014 | Wan | E21B 7/00 |
| | | | 455/67.11 |
| 2018/0270820 A1* | 9/2018 | Gupta | H04W 28/085 |
| 2018/0278543 A1* | 9/2018 | Gopalan | H04L 45/22 |
| 2018/0317134 A1* | 11/2018 | Leroux | H04L 61/5038 |
| 2020/0120131 A1* | 4/2020 | Soni | H04L 47/127 |
| 2020/0134423 A1* | 4/2020 | Shinde | G06F 11/3447 |
| 2020/0162336 A1* | 5/2020 | Gonguet | H04L 41/147 |
| 2020/0336923 A1* | 10/2020 | Li | H04W 4/021 |
| 2021/0064999 A1* | 3/2021 | Liu | G06N 3/084 |
| 2021/0250245 A1* | 8/2021 | Li | H04W 24/04 |
| 2021/0360427 A1* | 11/2021 | Jat | H04W 16/20 |
| 2022/0141093 A1* | 5/2022 | Sivaraman | H04L 47/2408 |
| | | | 709/226 |

* cited by examiner

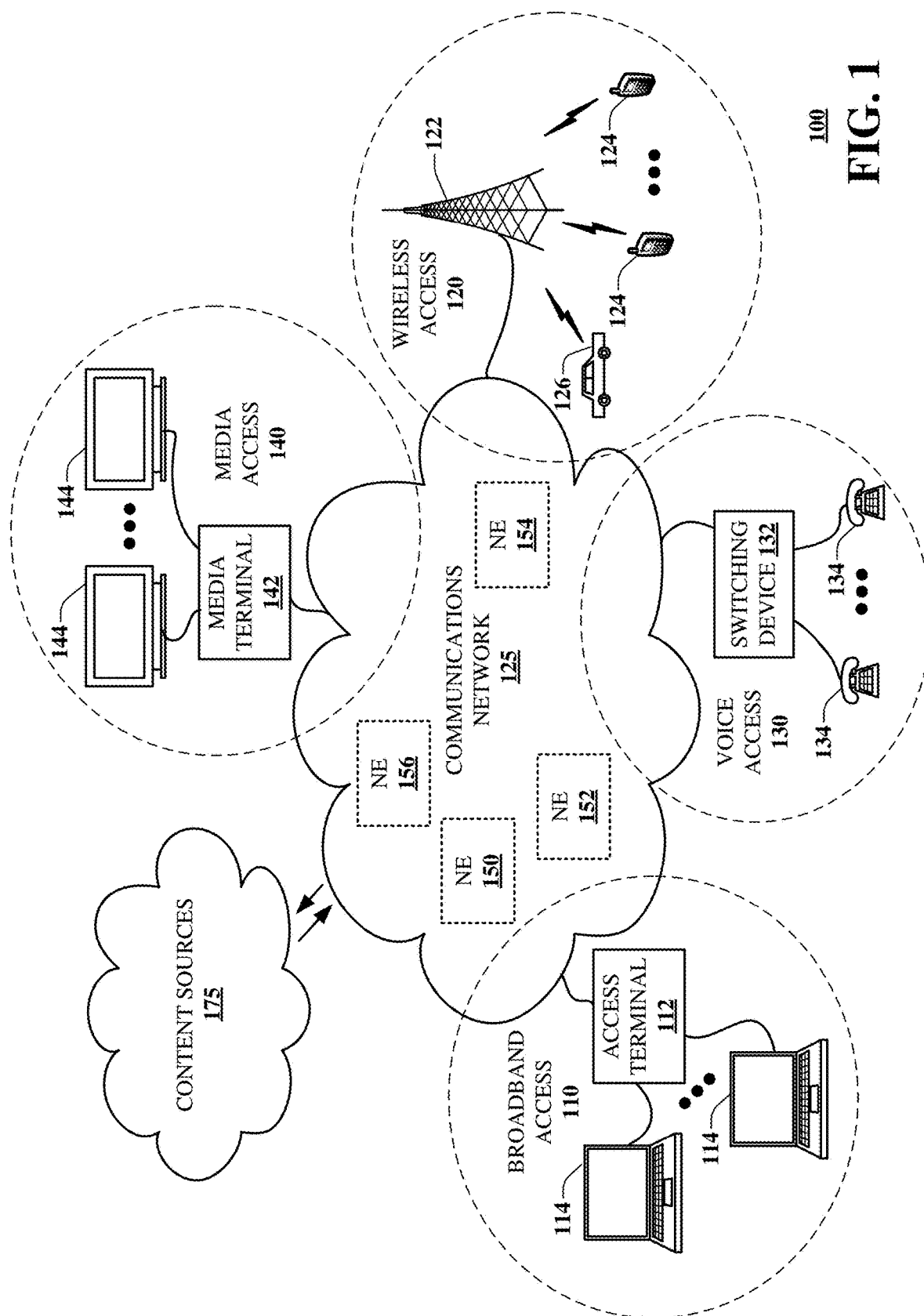

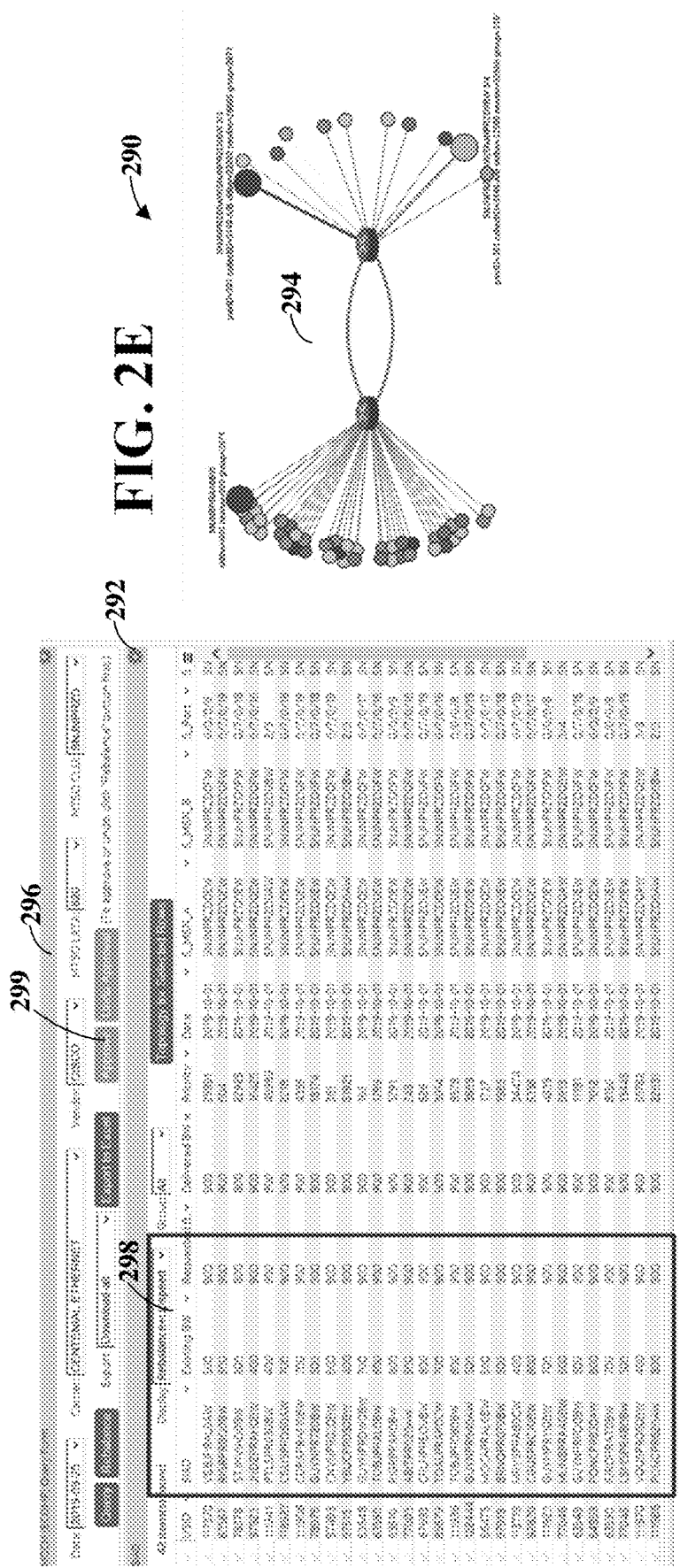

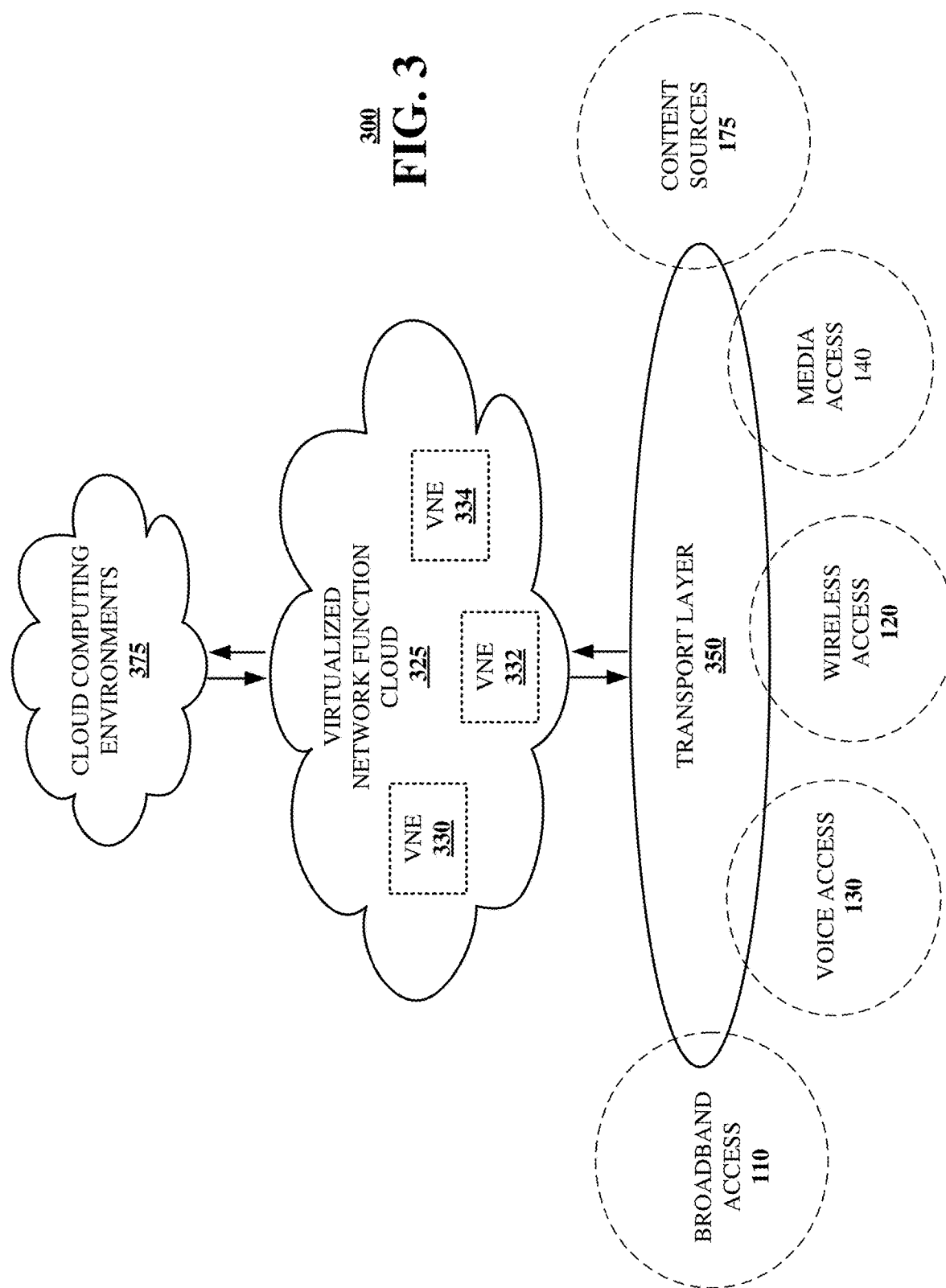

MOBILITY BACKHAUL BANDWIDTH ON DEMAND

FIELD OF THE DISCLOSURE

The subject disclosure relates to system and method for on-demand expansion of mobility backhaul capacity in a telecommunication system.

BACKGROUND

Telecommunication service providers may lease backhaul capacity from third-party suppliers. A backhaul network is a portion of a telecommunication system between the telecommunication service provider's core network and subnetworks such as base station radio networks at the edges of the telecommunication service provider's core network. As network usage grows, capacity of the backhaul network to carry additional communications traffic must be expanded.

BRIEF DESCRIPTION OF THE DRAWINGS

Reference will now be made to the accompanying drawings, which are not necessarily drawn to scale, and wherein:

FIG. 1 is a block diagram illustrating an exemplary, non-limiting embodiment of a communications network in accordance with various aspects described herein.

FIG. 2E is a diagram showing user interface presentation of a backhaul network after implementation of a new design in accordance with various aspects described herein.

FIG. 3 is a block diagram illustrating an example, non-limiting embodiment of a virtualized communication network in accordance with various aspects described herein.

DETAILED DESCRIPTION

Figure 2A:
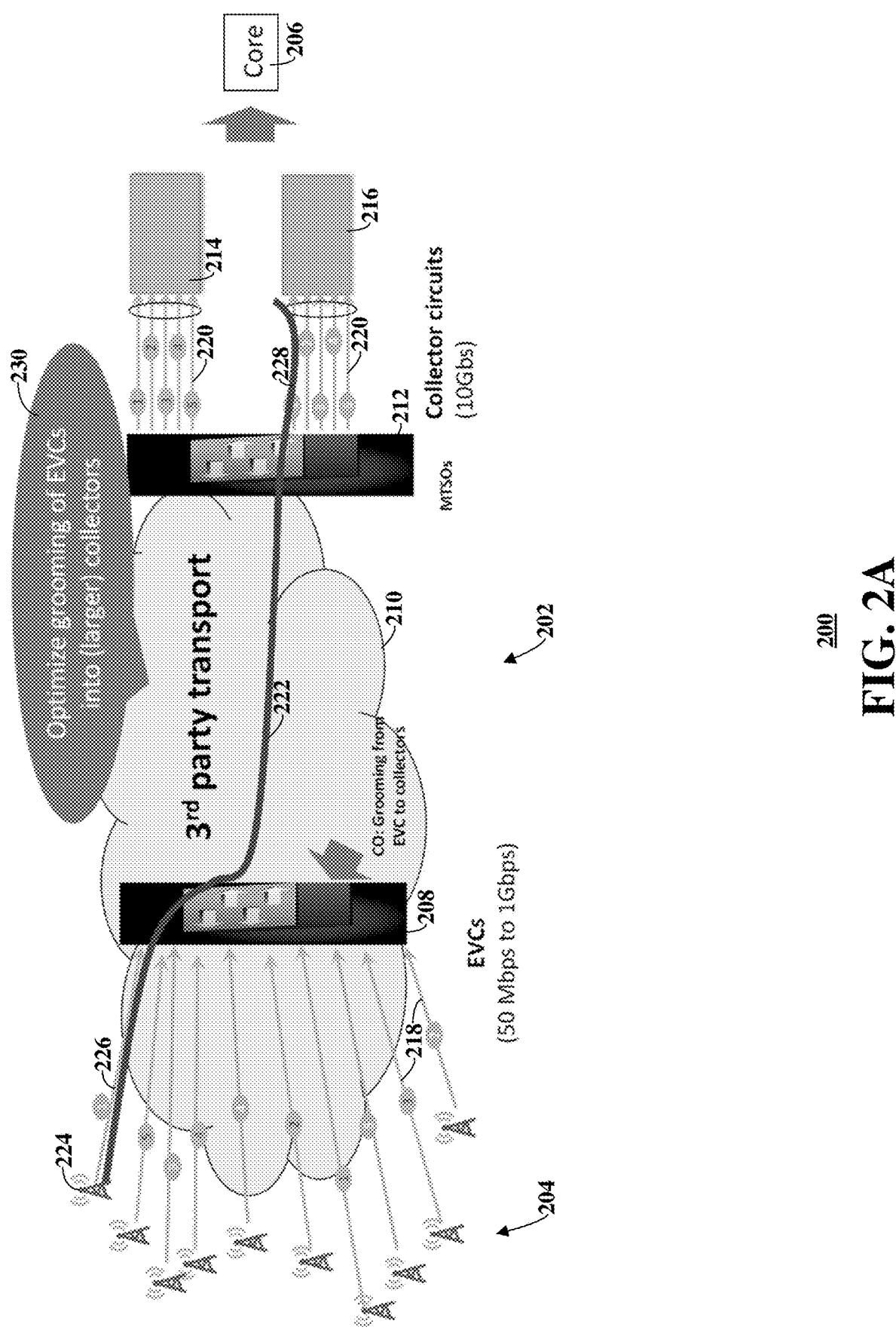
FIG. 2A is a block diagram illustrating an example, non-limiting embodiment of a system functioning within the communication network of FIG. 1 in accordance with various aspects described herein.

The subject disclosure describes, among other things, illustrative embodiments for a backhaul network implemented in a complete, end to end system with active user involvement. Conventional backhaul design required substantial manual effort to identify where additional capacity was needed, where additional capacity was available and to efficiently select and assign the available capacity from third party entities to a new design. This complex process required one year or more to complete and was subject to human errors, even as network demand continued to increase. Instead, the illustrated embodiments automatically identify increasing demand and need for increased capacity. Further, the illustrated embodiments automatically identify and select additional capacity, including efficiently selecting capacity so as to minimize wasting of added capacity. If desired, a user review process is available by which users can review and approve the design. Once approved, the design is implemented automatically, including network verification, provisioning, order placement with the third party entities and activation of the revised network according to the new design. Other embodiments are described in the subject disclosure.

One or more aspects of the subject disclosure include monitoring communication traffic in a communication network including a plurality of cell sites and a plurality of collector circuits over a time period, storing information about the communication traffic and information about available network resources in a database and predicting where additional capacity will be needed in the communication network at a future time, wherein the predicting is based on the information about the communication traffic. The subject disclosure may further include assignment of additional capacity in the communication network between the plurality of cell sites and the plurality of collector circuits based on the information about available network resources and communicating with network switches to assign the additional capacity within the communication network and initiate communication in the communication network.

One or more aspects of the subject disclosure include receiving usage data for a communications network which comprises a plurality of integrated access devices in data communication with one or more radio access networks and a backhaul network in data communication over a plurality of collector circuits with a core network, storing the usage data in a database, receiving current capacity data for the backhaul network and storing the current capacity data in the database. The subject disclosure may further include determining, based on the usage data and the current capacity data, requirements for new capacity in the backhaul network, retrieving, from the database, a plurality of constraints for the backhaul network, adding capacity in the backhaul network to satisfy the plurality of constraints, including developing a new design for the backhaul network. The subject disclosure may further include provisioning the new design including designating connections and equipment of the backhaul network and initiating communication on the backhaul network using the new design.

One or more aspects of the subject disclosure include receiving usage data about network traffic in a communications network which may include a cellular communication network, a core network and a backhaul network communicatively coupled with the cellular communication network and the core network and storing the usage data in a database system accessible by the processing system. The subject disclosure may further include receiving capacity data for the backhaul network, including receiving current capacity data and available capacity data for the backhaul network and receiving data defining a plurality of constraints, wherein the plurality of constraints include information about communication capacity in available third-party networks. The subject disclosure may further include adding capacity in the backhaul network according to the plurality of constraints and the usage data, including modifying design of the backhaul network to accommodate the usage data to develop a new design for the backhaul network, communicating information about the new design for the backhaul network according to the added capacity to the available third-party networks, and initiating communication between the cellular communication network, the core network and the backhaul network according to the new design for the backhaul network.

Referring now to FIG. 1, a block diagram is shown illustrating an example, non-limiting embodiment of a system 100 in accordance with various aspects described herein. For example, system 100 can facilitate in whole or in part identifying usage data in communication networks of the system 100, identifying currently used capacity and available capacity in the communication networks, and automatically improving network design to reconfigure network capacity or add additional network capacity. The design may be implemented automatically. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices. In accordance with some aspects of the subject disclosure, capacity of a backhaul network coupling the base station or access point 122 with the communication network 125 may be automatically optimized based on a set of constraints for the network.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A is a block diagram illustrating an example, non-limiting embodiment of a system 200 functioning within the communication network of FIG. 1 in accordance with various aspects described herein. The system 200 illustrates a backhaul network 202 in communication with a plurality of cell sites 204 and a core network 206. In the illustrated embodiment, the backhaul network 202 includes one or more telephone central offices (CO) 208, a transport network including, in part, one or more third party transport networks such as third party transport network 210, one or more mobile telephone switching offices such as mobile telephone switching office (MTSO) 212 and one or more collector circuits such as first collector circuit 214 and second collector circuit 216. The embodiment of FIG. 2A is intended to be exemplary only. Other examples will involve alternative network topologies and network components.

In one example, a mobile telecommunications service provider operates tens of thousands of cell sites such as the plurality of cell sites 204. These may correspond, for example, to the base station or access point 122 illustrated in FIG. 1 Each of the cell sites provides two-way radio communication to subscriber devices, such as mobile telephones, in a geographic area near the cell site. The cell sites may also be referred to as a radio access network (RAN). The subscriber devices may correspond to the mobile devices 124 illustrated in FIG. 1. Communication with a particular subscriber device may be handed off from one cell site to another as the subscriber device moves. Communication between the cell sites, mobile devices and other network components may be according to one or more communication standards such as those referred to as 3G, 4G and 5G cellular, as well as future-developed cellular standards and other standards as well.

Each of the cell sites of the plurality of cell sites 204 must communicate with the core network 206. Such communication includes communication of voice and data information with subscribers accessing cell sites. Such communication also includes command and control information, such as information to hand off communication with a particular subscriber from one cell site to another cell site. Communication between the cell sites 204 and the core network is generally through hardware and software of the backhaul network 202.

The backhaul network 202 includes communication equipment and networks operated by the mobile telecommunications service provider and communication equipment and networks operated by third parties. The mobile telecommunications service provider has a limited footprint in the area its equipment covers and the cell sites in direct communication with equipment of the mobile telecommunications service provider. A substantial portion of the plurality of cell sites 204 communicate data through third party transport carriers such as third party transport network 210. The mobile telecommunications service provider may lease equipment and services for the backhaul network 202 from the third party transport network 210 and other providers. By third party, it is meant that the owner or operator of the third party transport network 210 is an entity independent of the mobile telecommunications service provider that operates the cell sites 204 and customers of the mobile telecommunications service provider. Such third party transport carriers are generally in the business of providing telecommunication service for hire and sell or lease capacity for conveying data between points in a network. The third party transport carrier operates as a lessor of capacity. The mobile telecommunications service provider operates as a lessee of such capacity.

Leasing backhaul capacity in this manner allows the mobile telecommunications service provider to flexibly expand backhaul capacity of the backhaul network 202. The mobile telecommunications service provider can enter an agreement to obtain backhaul capacity from providers of other networks, such as the third party transport network 210, and expand backhaul capacity without having to build out the service provider's own backhaul network. This may save time and money for the effort required to build out the service provider's own network. Leasing backhaul capacity can allow the mobile telecommunications service provider to rapidly expand backhaul capacity, when required to meet customer demand, at reduced expense.

In order to keep up with the rapidly growing traffic on the cellular network including the plurality of cell sites 204, the mobile telecommunications service provider constantly needs to increase the capacity of the backhaul network 202. The conventional processes involved in designing, ordering and provisioning added backhaul capacity involve significant manual work. The amount of time taken to complete this work limits the frequency at which new capacity can be added. Currently, the mobile telecommunications service provider typically only orders new backhaul capacity for a cell site once per year. That is, only once per year can the mobile telecommunications service provider complete the process of reviewing its current and future planned needs for backhaul capacity and engage with one or more third parties to lease additional capacity for future expansion. This constraint, coupled with rapid traffic growth, means that the mobile telecommunication service provider needs to order bandwidth or additional backhaul capacity one year in advance of when the added capacity is actually needed. The added capacity is typically priced according to the amount of capacity leased and the duration of the lease. Ordering additional capacity from third-party providers thus can be wasteful and costs the mobile telecommunications service provider a significant amount of money each year.

An ability to automatically determine a need for added backhaul capacity, and to add the capacity as demand increases, in accordance with various aspects described herein. Such ability will modernize and automate how the mobile telecommunications service provider orders backhaul capacity, allowing the mobile telecommunications service provider to order capacity in smaller increments and closer in time to when the added capacity is needed. This may save the mobile telecommunications service provider substantial resources every year.

In the exemplary system 200 of FIG. 2A, the CO 208 communicates with respective cell sites of the plurality of cell sites 204 using Ethernet virtual connections (EVC) 218. In the illustrated embodiment, the CO 208 is communicatively coupled to each respective cell site by a respective EVC 218, though other connections and configurations may be used. Each EVC 218 typically has a capacity ranging from 50 Mbps to 1 Gbps. Added capacity for each cell site may be requested in increments, for example, of 50 Mbps. Capacity may be added as backhaul traffic with the website increases, such as when more mobile subscribers begin accessing the web site for voice or data services.

The collector circuits such as first collector circuit 214 and second collector circuit 216 in the MTSO 212 communicate with the backhaul network using connections 220 operate at, for example, 10 Gbps. In some embodiments, the backhaul network 202 operates to aggregate information communicated with respective cell sites of the plurality of cell sites 204 with a single collector circuit, such as first collector circuit 214 and second collector circuit 216. The process of aggregating EVCs together may be referred to as grooming. One such connection 222 is shown in FIG. 2A. The connection 222 shows a mapping of data communication from a first cell site 224 over an EVC 226 to CO 208, through the third party transport network 210 to MTSO 212 and over 10 Gbps connection 220 via virtual circuit 228 to second collector circuit 216. Mapping of connections is indicated by the numbers 1 through 5 shown to each of the first collector circuit 214 and the second collector circuit 216 and respective cell sites of the plurality of cell sites 204.

Connections from the cell sites to the collector circuits must be accurately mapped or remapped as part of the process of expanding capacity of the backhaul network 202. This mapping must be done considering bandwidth limitations, changes in demand, available capacity and other factors. Also, sometimes a collector circuit such as first collector circuit 214 is already full or near capacity and cannot be further loaded. Mapping may be done by reassigning connections to make better use of available capacity or by adding additional capacity. Reassigning connections to more efficiently use existing leased capacity may be preferred as reassignment generally does not require additional expense to lease new capacity.

For example, in FIG. 2A, there are five EVCs, labelled 1-5, connecting cell sites to the CO 208 and, through the backhaul network 202 to second collector circuit 216. If initially all five EVC connections have a capacity of 50 Mbps and the connection to the collector circuit has a capacity of 10 Gbps, there is sufficient capacity for current conditions. However, if in this example, the five cell sites need to plan for future expanded demand and capacity of 1 Gbps each, the second collector circuit 216 may not have the available capacity to expand to accommodate the added demand. In that case, future demand will require reassigning, or remapping, connections through the backhaul network 202 to accommodate the expanded demand and provide the required capacity.

Therefore, increasing capacity requires moving the assignment of a particular cell site from one collector circuit to another collector circuit. This must be done taking into consideration factors such as current demand and future or planned demand and capacity, geographic limitations, and the availability of backhaul infrastructure or equipment owned by the telecommunications service provider and available from third-party sources.

Thus, modifying the system 200 including the backhaul network 202 requires an optimization process 230, including identification and assignment of resources currently available and projected to be available in the future. This optimization process 230 includes identification, leasing and assignment of additional leased backhaul capacity from third-party providers. Further, optimization can include packing more traffic into fewer collector circuits to reduce third-party transport costs, and optimizing can include arranging how EVCs are mapped to collector circuits. Conventionally, this optimization is done manually by persons using the information available to them at the time. As indicated, because of the complexity of the task, and the need to plan for rapidly increasing demand, capacity increases have been planned for and leased up to a year in advance. The optimization process 230 may include improvement of one or more performance criteria or figures of merit, and may include joint improvement of multiple factors. The improvement may be such that not all factors are improved or maximized, but as a group, considered together, they are improved in a way that may be considered optimum for the circumstances.

Figure 2B:
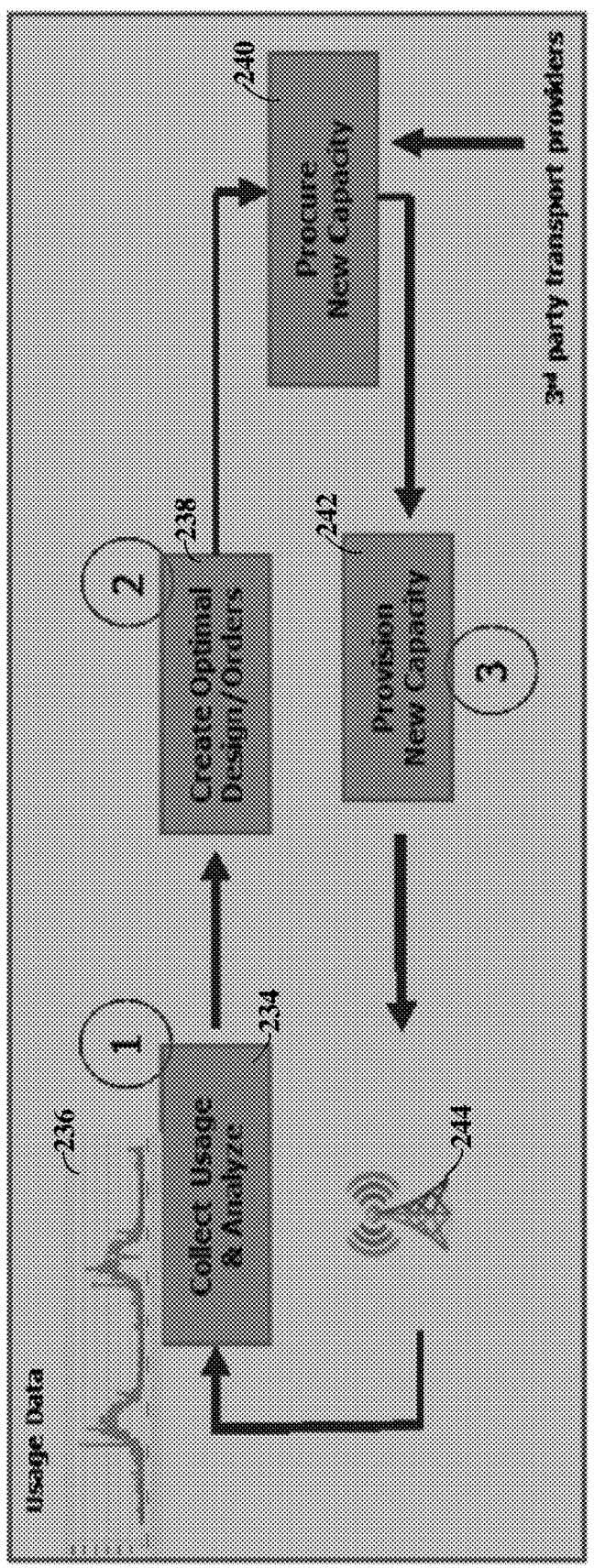
FIG. 2B is a flow diagram illustrating a process for ordering cell site backhaul capacity in accordance with various aspects described herein.

FIG. 2B is a flow diagram illustrating a process 232 for ordering cell site backhaul capacity in accordance with various aspects described herein. The process 232 may be implemented by an operator of a telecommunications network such as a cellular network. The process 232 may be implemented in any suitable manner. In particular embodiments, the process is implemented in whole or in part by one or more data processing systems and may be automated to require minimal human interaction.

The process begins at step 234. Usage data 236 for a cellular or other communications network is collected and analyzed. The usage data 236 may be collected for one or more components of the communications network, such as one or more cell sites such as the cell sites 204, one or more switches, one or more central offices such as the CO 208, and one or more MTSO such as the MTSO 212 in FIG. 2A. The usage data indicates information such as volume and duration of voice calls, handover frequency among different base stations or radio access networks, data access, for example, for internet access and for streaming data to a user terminal. The usage data may provide insight into how subscriber access to the communications network is changing over time and thus how network infrastructure may need to be adapted to track changes in network usage. Accordingly, the usage data may be collected over a predetermined time, such as one week, one month or six months or even over a period of years.

The collected usage data may further indicate information such as call failure information or information about when the network was unavailable for a voice call or a data call. The usage data including information about failures may provide insight into where capacity increases are most urgently needed. This includes geographical locations served by the communications network and locations within the network where capacity may need to be expanded.

The usage data may include information about usage at a radio access network between cell sites and subscriber units or mobile devices. The usage data may further include information about usage in the backhaul network between the cell sites and a core network. The usage data may be organized according to data, third-party carrier that conveys the data, a vendor of switching equipment that conveys the data and location within a network, such as identification of a mobile telephone switching office (MTSO) or local access transport area (LATA). The usage data may be defined according to one or more switches or other network devices, such as a cell Site Access Device or Smart Integrated Access Device (SIAD). For example, a SIAD may integrate traffic from multiple base stations located at a single cell site and provide routing upstream to the backhaul network and the core network. The usage data may be retrieved from any convenient source such as individual base stations, switching offices, data farms containing stored historical data and from subscriber devices. The usage data retrieved at step 234 may cover any suitable time period, such as one day, one week, one month, etc.

Collection of usage data further includes collecting information about currently used and available network resources. This information includes information about network infrastructure owned and operated by the operator of the telecommunications network. This information includes information about network infrastructure owned and operated by third party operators who have network infrastructure and capacity that is currently leased by the operator of the telecommunications network. This information may further include information about available network infrastructure and capacity owned by third party operators that may be added to the existing backhaul network of the operator of the telecommunications network should expansion of capacity be required. For third party operators, such information may include information about geographical locations of the infrastructure, switching and hookup information about accessing the infrastructure, current traffic information and available capacity, and cost information.

At step 238, an optimal design for the backhaul network is established. Establishing an optimal design requires consideration of many factors. These include current capacity of the backhaul network and current and anticipated demand, geographical factors, and others. Those factors are in turn informed by the analysis performed at step 234. Other factors include the relative availability and cost of added capacity for the backhaul network, both from facilities of the operator of the telecommunications network and from facilities of third-party suppliers. In general, the design that is created by step 238 includes reconfiguring existing portions of the backhaul network to accommodate existing or anticipated growth in data traffic and acquiring additional network facilities to supplement existing network facilities. The optimization step 238 may include improvement of one or more performance criteria or figures of merit, and may include joint improvement of multiple factors relating to the backhaul network. The improvement may be such that not all factors are improved or maximized, but as a group, considered together, they are improved in a way that may be considered optimum for the circumstances of for specified criteria.

Based on the design and the need to acquire additional network facilities, one or more orders are generated to request the needed facilities from third-party providers. In some embodiments, order generation may be automated. For example, a generated order may include information about infrastructure to be added, such as switches, connector circuits, communication ports to be accessed, capacity to be reserved, etc. In some examples, a standardized order format may be used for communicating an order with a third-party network operator to interconnect facilities of the operator of the telecommunications network with the third party network operator.

At step 240, based on orders generated at step 238, facilities required to expand capacity are procured. Procurement may involve designating what physical infrastructure, such as switches, fiber optics and other data connections are to be added to the backhaul network. Procurement may further include legal arrangements such as contracting for the new capacity, payment for the new capacity, etc.

At step 242, the newly acquired facilities are provisioned. Provisioning may include physically, mechanically, and electronically connecting the new facilities to the existing backhaul network. Provisioning may further include reconfiguring existing facilities of the backhaul network according the design developed at step 238. In some embodiments, order provisioning may be automated. Data processing equipment of the operator of the telecommunications network may communicate with data processing equipment of the third party network operators to assign and activate the newly acquired facilities in the network of the operator of the telecommunications network.

After provisioning, the network is operated at step 244 according to the design of the backhaul network. Operation of the network allows generation, collection and analysis of network data and the process 232 to continue at step 234. The step 234 may be operated in as many loops as required and at whatever time interval is appropriate. The process 232 may be an on-going process to monitor capacity of the network and update capacity and network facilities to adapt the network to changing network usage over time.

FIG. 2B is a high-level depiction of a process to add capacity or bandwidth to a communications network. Steps 234, 238 and 242 in particular lend themselves to automation. Where the process 232 is done manually, the most laborious step is the analysis and improvement or optimization to determine the correct level of capacity to add before ordering incremental backhaul capacity, indicated as step 238. The amount of time needed to complete this step limits the frequency of new capacity additions. Currently, a network operator may add new capacity for cell site backhaul only about once per year. This results in capacity which is ordered well in advance of when it is actually needed. This added capacity may lay idle while incurring expensive recurring charges paid to third party suppliers.

Figure 2C:
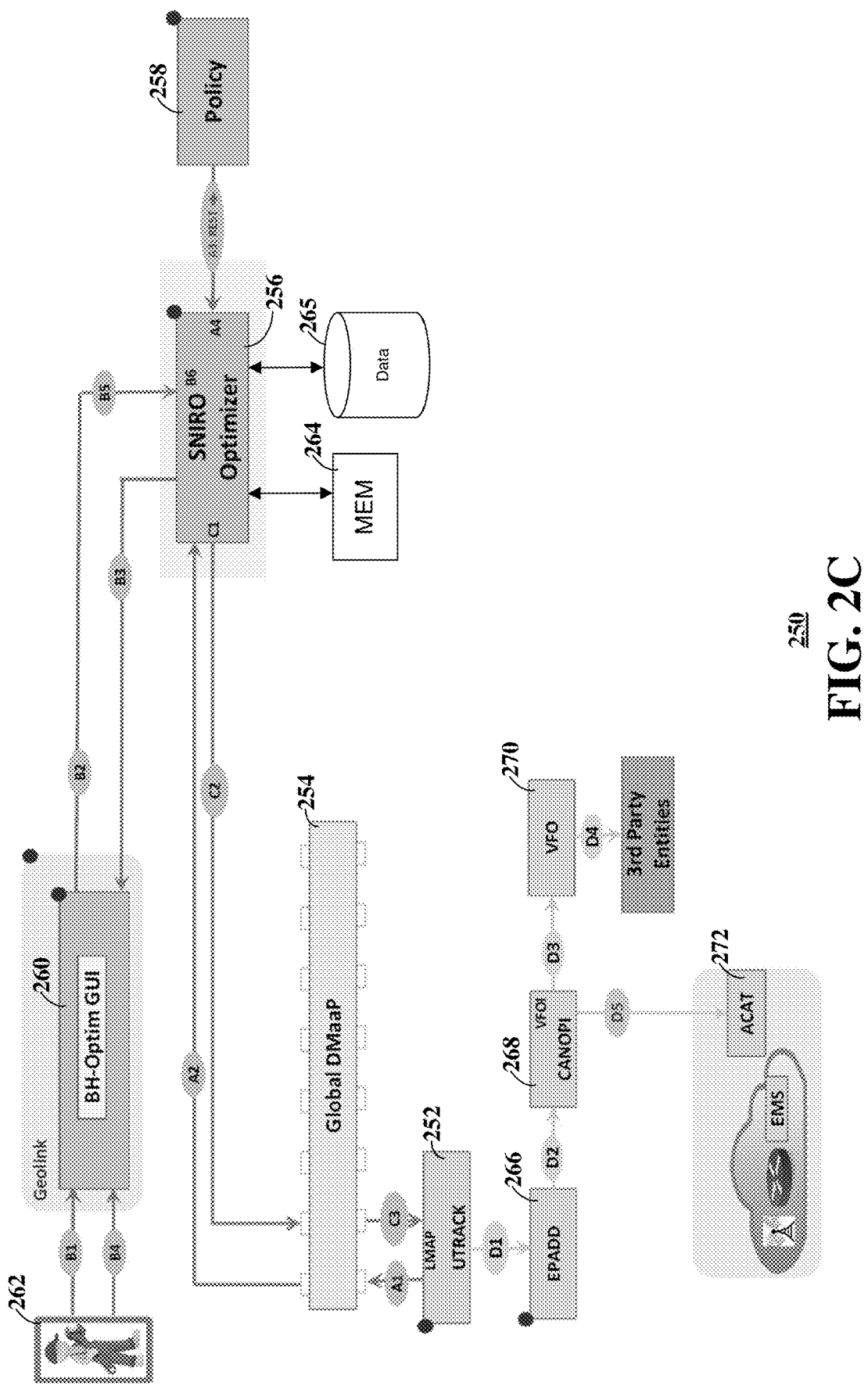
FIG. 2C is a diagram illustrating structure and operation of a system and process for addition of capacity to a backhaul network in a telecommunications system in accordance with various aspects described herein.

FIG. 2C is a diagram illustrating structure and operation of a system 250 and process for improving or optimizing addition of capacity to a backhaul network in a telecommunications system in accordance with various aspects described herein. FIG. 2C illustrates aspects of embodiments of multiple phases of design and operation of the system. The first phase, including operations labelled in the drawing figure as A1, A2, A3 and A4, is an exemplary embodiment of a design phase for designing a new backhaul on demand system. The second phase, including operations labelled B1, B2, B3, B4, B5 and B6, is an exemplary embodiment for reviewing a design for a new backhaul system and approving the new design. The third phase, including operations labelled C1, C2 and C3, is an exemplary embodiment illustrating publication of the new backhaul system. The fourth phase, including operations labelled D1, D2, D3, D4 and D5, is an exemplary embodiment illustrating network configuration verification. These embodiments are intended to be exemplary only.

The system 250 embodied in FIG. 2C includes a data collection system 252, communication switch 254, optimizer 256, and policy engine 258 for developing a new design for a backhaul on demand system. Embodiments of the system 250 may further include a user interface device presenting a user interface 260 accessible by a user 262 for reviewing a design of a backhaul network. The system 250 may further include a memory 264 and, in some embodiments, a database 265. In some embodiments, the system 250 may further include a cellular network site planning and design database 266, a provisioning engine 268, an internal ordering system 270 and a network activation manager 272. Other embodiments may include similar, additional or fewer elements.

As noted, as first phase includes a design phase for designing a new backhaul on demand system for a telecommunication arrangement such as the backhaul network 202 of FIG. 2A. At a first operation of the design phase, labelled A1 in FIG. 2C, the data collection system 252 sends a request for a new or updated design along with information about the existing backhaul design to the communication switch 254. This request and existing design information is relayed by the communication switch to the optimizer 256. The data collection system 252 collects and stores information about the current network design and the current backhaul system. The data collection system 252 prepares a request showing where the design must be performed for the updated backhaul system. For example, the request will specify current collector circuits such as first collector circuit 214 and second collector circuit 216 (FIG. 2A) used in the backhaul system. For example, the request will specify where in the network an increase in backhaul capacity is required, as well has how much increase in capacity is required. This information may be specified geographically or by identifying a collector circuit or a switch at which the collector circuit terminates. This information may include specification of one or more cell sites needing revision to increase capacity.

The request may further specify how much capacity of the current backhaul design is already in use and how much is spare capacity. For example, if a collector circuit or group of collector circuits have enough spare capacity, the new design may involve simply moving to higher speed circuits. On the other hand, if enough spare capacity does not now exist, the new design may need to move to other collector circuits having enough spare capacity. Thus, the data collection system 252 collects information about how much capacity is available, for example, on the right side of FIG. 2A and how much capacity is or will be required by the left hand side of FIG. 2A, where the right hand side illustrates collector circuits of the backhaul network 202 and the left hand side illustrates cell sites that must be connected by the backhaul network 202 to the core network 206.

Other information collected by the data collection system 252 includes network relevant information. Such network relevant information may be at a finer granularity than the capacity information and may specify details of network topology and interworking, including specifying for example network meet-points where different networks have a physical connection of equipment or transmission facilities. Such network relevant information may be pertinent to designing a new backhaul system. Information about the current backhaul system may be specified by any suitable means and included in a request prepared by the data collection system 252.

In the design phase, the data collection system 252 communicates the request to the communication switch 254. The communication switch 254 in some embodiments forms a data and messaging router. In one embodiment, the communication switch 254 may be implemented as a high-volume messaging service with an application programming interface that is delivered as a web service to users. Conveying the request through the communication switch 254 is optional and merely provides a convenient data communication pathway.

At a second operation of the design phase, labelled A2 in FIG. 2C, the communication switch 254 conveys the request to the optimizer 256. The request may be communicated in any suitable fashion, such as by sending data over a network such as the internet to the optimizer 256. The optimizer 256 may be referred to as a Service, Network, Infrastructure and Resource Optimization (SNIRO) system. Among other functions, the optimizer 256 implements an optimization engine for designing a new backhaul system in response to a request received from the data collection system 252. The optimizer 256 may be implemented in software, hardware or a combination of these. In some embodiments, the optimizer 256 may implement a machine learning system when designing a new backhaul network. The optimizer 256 at the operation labelled A3 in FIG. 2C calls a policy from the policy engine 258.

Design of a backhaul system, whether manually or automatically by the optimizer 256 or other system, is performed around a large number of constraints. Such constraints include a large amount of information about existing networks, about existing traffic, and about projected growth in traffic. Such constraints further include information about available third-party networks available for lease for added backhaul capacity. Other constraints apply, as well, and all must be considered when planning or redesigning a backhaul network.

In some embodiments, the design constraints are not hard-coded in software. Instead, the constraints are configured as a policy, using policy engine 258. A policy can include any suitable information, organized in any suitable manner, for controlling how the optimizer operates in response to the request received from the data collection system 252. In one embodiment, a policy may include a series of line items. Each line item includes a particular constraint that must be accommodated by the optimizer 256. A constraint may be described as a condition rather than as an exact mathematical formula. An example constraint is a limitation to only use network infrastructure provided by a particular carrier named Carrier A, to the exclusion of network infrastructure of Carrier B. Thus, a policy might include the constraint that any new design for a backhaul network must only include infrastructure of Carrier A. However, business conditions and technology conditions and network conditions change over time. It may occur that, the next time a contract for provision of network services is renegotiated, the terms offered by Carrier B may justify a relaxation of the constraint excluding Carrier B. In such a case, a line item of the policy specifying this constraint may be modified or updated to reflect the change. In another example, particular collector circuits may be selected to be excluded from a new design according to a particular policy or line item of a policy.

Configuring a policy provides substantial flexibility that would not otherwise be available, for example if constraints and other aspects of a design were hard-coded. For example, if at some time there is a desire or need to relax or vary one or more constraints, the policy can be changed without having to re-code the software. Thus, in the example above, the change from excluding infrastructure of Carrier B to including infrastructure of Carrier B may be readily made by modifying the policy. In some embodiments, a user interface may be provided for network or web-based access to the policy engine 258 for quick and user-friendly changes to line items of a policy. A user need not have a detailed technological knowledge to modify constraints to explore different designs. Changing constraints or other aspects of a policy is much simpler, faster, more reliable, and less subject to error, than having to re-code constraints and other design features that are hard-coded into the optimizer. Moreover, the ability to quickly and easily change a policy allows different designs to be automatically developed by the optimizer 256 based on variations in the policy. This allows a network designer to experiment with different options to further optimize network development.

Still further, the ability to develop and modify a design by specifying a set of constraints means that a user does not need to have detailed domain knowledge. For example, aspects of a design might include the geography of the infrastructure including the cell sites and the collector circuits, the technology of different cell sites and the collector circuits and the core network, financial aspects of relationships with third party suppliers, etc. Specifying a set of constraints for a design eliminates the need to know the respective details of those areas of the design.

At a fourth operation of the design phase, labelled A4 in FIG. 2C, the optimizer 256 performs data processing and improvement or optimization to develop the new design. The optimizer 256 receives the request from the data collection system 252 and constraints from the policy engine 258. Based on these, and any other suitable information, the optimizer 256 develops a new design to satisfy the request in light of the constraints specified by the policy. This represents the most intensive part of design of a new backhaul network. As noted, conventional network design or redesign is done manually. In addition to being a large-scale task with substantial data as input and with many constraints to accommodate, it may occur that some other opportunities may be blocked or missed by a manual design. For example, the manual designs may be done one-by-one for each collector circuit. Optimizing one design for one collector circuit may block another opportunity where network infrastructure could be used in a more efficient way. Examples include combining available bandwidth in particularly efficient ways so that no available bandwidth is wasted. In some embodiments, a set of requests may be received by the optimizer 256 from the data collection system 252. The optimizer 256 may take into account all aspects of each request of the set of requests, along with the constraints from the policy engine 258, so that all requests are mutually improved or optimized, and infrastructure such as the collector circuits are maximally or most efficiently utilized. The optimizer 256 may implement improvement of one or more performance criteria or figures of merit or operational aspects of the backhaul network, and such improvement or optimization may include joint improvement of multiple factors. The improvement may be such that not all factors are improved or maximized, but as a group, considered together, they are improved in a way that may be considered optimum for the circumstances or the constraints specified by the policy. Such a large-scale project, with many variables, would require too much time to accomplish manually.

In an example, an existing collector circuit has 1 (Gbps) spare capacity. Another collector circuit has available capacity of 50 Mbps. If request arrives for a circuit that requires 40 Mbps, the best choice to satisfy the request may be to use the 50 Mbps available capacity. In that case, nearly all spare capacity is used, leaving just 10 Mbps spare left over. That 10 Mbps may be difficult to utilize. On the other hand, if the design uses the spare capacity of 1 Gbps for the requested 50 Mbps, the 1 Gbps becomes fragmented, which may result in wasted spare capacity. Joint optimization of multiple requests allows many collector circuits to be optimized together, rather resolving one request after another.

The optimizer 256 may be implemented using any suitable improvement or optimization routine or algorithm. One example embodiment uses the MiniZinc constraint modeling language. MiniZinc is useful to model constraint satisfaction and optimization problems. MiniZinc is an open source integer linear programming (ILP) product. Other modeling software may be used as well or in addition. MiniZinc may serve as a front end for defining mathematical formulations of a problem. Other open source products may be combined with the front end as a controller or optimization solver for ILP problems.

The embodiment shown in FIG. 2C includes a memory 264. Memory 264 may be local memory associated with the optimizer 256. The memory 264 may store data used or produced by the optimizer 256 such a copy of the request, a copy of the completed design, and intermediate data as well.

In some applications, the system 250 may be part of a larger computer environment that may be termed an Enhanced Control, Orchestration, Management and Policy system, or ECOMP. ECOMP may be implemented with redundant systems including a primary system and a secondary system. If the primary system goes offline for maintenance or other purposes, or if the optimizer 256 or other components of the system 250 are moved from the primary system to the secondary system, the local memory 264 and the data stored in the local memory 264 may not be immediately available to the optimizer 256. The optimizer 256 may loses connectivity to the local memory 264.

Accordingly, in some embodiments, the system 250 includes a database 265 for storing data. Data stored in the database 265 may include data used or produced by the optimizer 256 such as a copy of the request from the data collection system 252, a copy of the completed design produced by the optimizer, a copy of one or more policies and intermediate data as well. The database 265 may be accessible by a variety of components for data storage and retrieval, including the data collection system 252, the communication switch 254, the optimizer 256, the user interface 260 and the policy engine 258. The database 265 may be accessible, for example, over a network or through the communications switch 254. By using a database such as database 265, stored data may be accessible even in data processing systems that use primary and secondary systems. This provides advantages of flexibility and reliability for the system 250 including the optimizer 256.

In the first phase or design phase, the optimizer 256 produces a design for a new or modified backhaul network based on the request and the constraints from the policy engine 258. A second phase includes an exemplary embodiment for reviewing the design for a new backhaul system and approving the new design. The review phase is illustrated by operations labelled B1, B2, B3, B4, B5 and B6 in FIG. 2C. The review may be done by accessing a user interface device to use a user interface 260 by a user 262. For example, the new design may be reviewed by the user 262 who is responsible for executing an order which will implement the new design in actual network infrastructure. The review may be performed by the user 262 to ensure that the design is viable or meets specified requirements. The review process may be optionally provided after the design is complete. However, since the design is developed by the optimizer 256 automatically without human intervention, providing a review of the completed design may be useful for ensuring that users are comfortable with the solution produced by the optimizer 256. Moreover, any unforeseen issues may be discovered and corrected during the review process.

At a first operation of the review phase, labelled B1 in FIG. 2C, the user 262 accesses the user interface 260 to request the design from the optimizer 256. For example, while the network of cell sites may include many thousands of cell sites, the user 262 only needs to review certain portions of the network of interest. The user 262 may prepare a query using the user interface 260 to specify the network portions of interest for review.

The user interface 260, at operation B2 in FIG. 2C, communicates a request to the optimizer 256 for the design. For example, the request to review the design may be communicated over the internet or any other suitable communication network. In one example, the user interface 260 may be implemented using GeoLink. GeoLink is an application program forming a data collection tool which utilizes information such as Global Positioning System (GPS) data to provide georeference information for information or sensor data. The collected information can be provided in various map formats and other formats for data visualization at the user interface 260 by the user 262. In a particular application, the user interface 260 implements a backhaul optimization graphical user interface, illustrated as BH-Optim GUI in FIG. C. The user interface 260 may be presented on any suitable user interface device such as a laptop computer, a tablet or other device capable of accessing data over a network and presenting data to the user.

At operation B3 in FIG. 2C, information about the design is returned to the user interface 260 for review by the user 262. The user 262 may be a planner responsible for managing current and future network capacity. The user 262 may be an engineer employed by the operator of the network including the plurality of cell sites 204 (FIG. 2A). Alternatively, the user may be an engineer or other individual employed by a telephone service provider for a local access and transport area (LATA) or mobile telephone switching office (MTSO).

At operation B4 of FIG. 2C, the user 262 may review the new design using the user interface 260. After a design is completed, the user 262 may review the design. The user 262 will view the new design and its features. For example, the user 262 may view, for each collector circuit, what the current demand is and what change is recommended, such as where a collector circuit or the traffic it carries should be moved to. The user 262 can determine if the design may be implemented.

If the user 262 approves the design at operation B4 of FIG. 2C, the approval is communicated by the user interface 260 to the optimizer 256 at operation B4 of FIG. 2C. At operation B6 of FIG. 2C, based on the approval received from the user interface 260, the optimizer 256 generates an approved list for publication. This is an internal process for the optimizer 256.

The review process of operations B1-B6 allows the users to gain confidence in the automatically generated design.

The review process allows users to review individual aspects of the design that has been prepared and compare with known best practices, compare with experience and expertise of users and identify any shortcomings, limitations or overlooked aspects of the automatically generated design. This can provide improvements to the final design, this can improve the design process, and this can allow individual users to develop a degree of confidence in the results of the automatic design process of operation A1-A4.

Figure 2D:
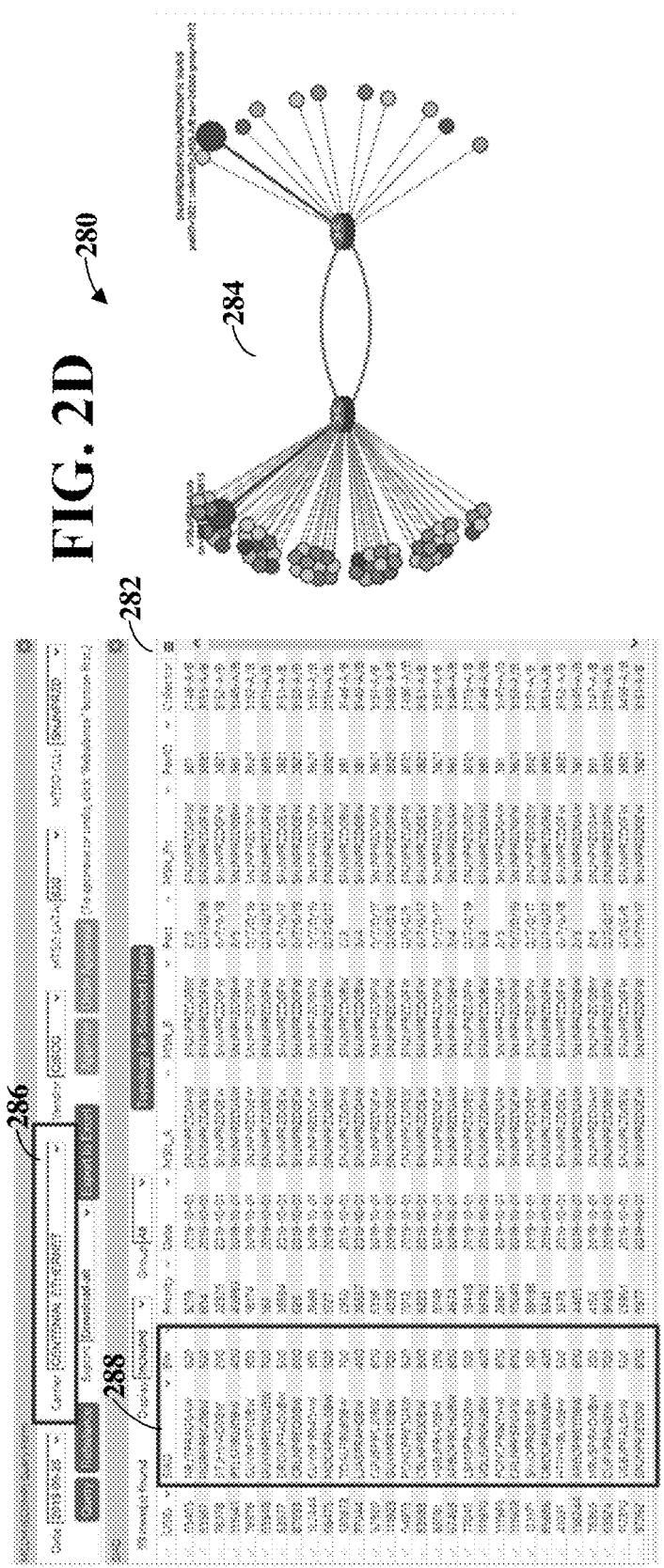
FIG. 2D is a diagram showing user interface presentation of a backhaul network prior to implementation of a new design in accordance with various aspects described herein.

FIG. 2D is a diagram showing user interface presentation 280 of a backhaul network prior to implementation of a new design in accordance with various aspects described herein. The user interface presentation 280 includes a table 282 and graphical representation 284 of network connectivity. The table 282 shows a list of cell sites, related bandwidth information and the collector circuits the cell sites currently routed over. The table 282 includes user-selectable features that allow the user 262 to display information about SIADs whose backhaul circuits routed over a particular carrier network. Thus, in the example, selector of the user selectable features 286 is set to display cell sites whose backhaul routed over a carrier called Centennial Ethernet. Also, the vendor (Cisco in this example) as well at MTSO LATA and MTSO CLLI may be selected or specified by the user. The table 282 includes highlighted columns 288 specifying identifiers for respective external Ethernet interface devices such as Smart Integrated Access Device (SIAD) and respective bandwidth (BW). In the illustrated example, typical bandwidths for respective SIAD devices are 200-800 Mbps. The listed bandwidths are for an existing backhaul network prior to beginning of a new design. The table 282 further includes columns labelled MSN_A and MSN_B. Those columns identify respective switches of the collector circuits. Each cell site is mapped to two collectors terminating at two switches listed in the table 282. Further, the table 282 further includes a column labelled Port which identifies the port of a switch to which the collector circuit terminates.

The graphical representation 284 shows a representation of the collector circuits connecting cell sites, at the left of the graphical representation 284 and switch terminations at the right of the graphical representation 284. This shows to a user 262 (FIG. 2C) visually how cell sites on the left are connected to and correspond to and are distributed to the collector circuits on the right. Color coding shows how the many cell sites on the left of the graphical representation 284 are distributed among the collector circuits on the right side of the graphical representation 284. Further, individual elements of the graphical representation 284 may be selectable by the user such as by clicking a mouse or touching a touch-sensitive display to call up additional information and displays on the user interface presentation 280. A larger dot and thicker line indicate that the cell site and the collector are selected for closer examination.

FIG. 2E is a diagram showing user interface presentation 290 of a backhaul network after implementation of a new design in accordance with various aspects described herein. The user interface presentation 290 includes a table 292 and graphical representation 294 of network connectivity reflecting the new design. The table 292 shows a list of cell sites, related bandwidth and collector circuits information. The table 292 includes user-selectable features 286 that allow the user 262 to display information about connector circuits to focus in on particular aspects of the new design.

The table 292 includes highlighted columns 298 specifying identifiers for respective Smart Integrated Access Devices (SIAD) and respective bandwidth (BW) for each respective SIAD. In the illustrated example, current bandwidths for respective SIAD devices are 400-800 Mbps. Further the highlighted columns 298 show the newly requested bandwidth (requested BW) was 900 Mbps in all cases.

If the user approves the design summarized in the user interface presentation 290, the user may select an approval actuator 299 to indicate approval. The design then enters an approval phase. The approval may return the design from the user interface 260 to the optimizer 256 in FIG. 2C.

Referring again to FIG. 2C, a third phase in an exemplary embodiment for publishing the reviewed design for a new backhaul system is shown. The publication phase is illustrated by operations labelled C1, C2 and C3 in FIG. 2C. In the operation designated C1, the optimizer 256 periodically checks to see if there are new, approved designs ready for publishing. There period for performing the check, such as hourly or daily, may be set by any suitable technique, including specifying the period in a policy used by the optimizer 256. If there is a new design ready to be published, the optimizer 256 sends information about the design to the data collection system 252. The information sent by the optimizer 256 may include details of the design in any suitable data format. Alternatively, the optimizer 256 may send a notification to the data collection system 252 indicating where such information may be located, such as in the local memory 264, in the database 265 or other source. In the illustrated embodiment, the optimizer 256 conveys the information about the design to the communication switch 254 to be relayed to the data collection system 252. Alternatively, the information about the design may be sent directly from the optimizer, or other location, to the data collection system 252. At operation C3, the data collection system 252 receives the information about the design and begins to create an order.

In accordance with some embodiments, order creation for a new design is a standardized, automated operation. After a new design is completed and verified, next steps include adding the new capacity, disconnecting old collector circuits that are no longer used and connecting the new collector circuits forming the new design.

Initially upon receiving the new design from the optimizer 256, the data collection system 252 performs a network configuration verification operation. For example, the data collection system 252 may confirm that network elements are configured as required and that all necessary data for configuring circuits and switches that are part of the new design are in place and ready for the new design. Omitting such a verification operation may cause reduced throughput and delay in implementing the new design. Accordingly, the network configuration verification operation is performed before pushing the new design to the downstream network components.

After performing the network configuration verification operation, at operation D1 in FIG. 2C, the data collection system 252 sends a request to a cellular network site planning and design database 266, designated EPADD in FIG. 2C. The site planning and design database 266 provides a graphical user interface application for creating or updating network connections, such as using Ethernet or other communication protocols, to a cell site planning and design database.

At the operation designated D2, the site planning and design database 266 sends a verified data file to a provisioning engine 268. In the example of FIG. 2C, the provisioning engine 268 is referred to as Converged AT&T Network Operations Provisioning and Inventory ("CANOPI"). The provisioning engine 268 may include a number of functional capabilities, including design and inventory management, discovery, activation and provisioning and reconciliation. Each of these functionalities may be accessible using a graphical user interface accessed by users. In particular embodiments, each of these functionalities is automated in response to the new design received from the data collection system 252.

At the operation designated D3 in FIG. 2C, the provisioning engine 268 generates a work order and passes the work order to internal ordering system 270 which formats the work order to the correct format for respective third party entities. The work order is passed at operation D4 to the third party entities which implement the work order. In this example, the third parties include third party network operators providing backhaul network capacity. The work order specifies details of the new design, including identifying which collector circuits and which switches are to be connected to which cell sites or SIADs to establish the new or revised backhaul network having increased capacity in accordance with the new design. Once the design is implemented by the third party entities, and the new connector circuits are in place, at operation D5 the provisioning engine 268 causes a network activation manager 272 to initiate execution. The network activation manager 272 may cooperate with an equipment management system (EMS) of the vendor of the switch that is being configured into the new backhaul network. The mobile network begins operating with the new design for the backhaul network in place.

In accordance the present embodiments, a new design for a backhaul network may be prepared and implemented in a complete, end to end system with active user involvement. Conventional backhaul design required substantial manual effort to identify where additional capacity was needed, where additional capacity was available and to efficiently select and assign the available capacity from third party entities to a new design. This complex process required one year or more to complete and was subject to human errors, even as network demand continued to increase. Instead, the illustrated embodiments automatically identify increasing demand and need for increased capacity. Further, the illustrated embodiments automatically identify and select additional capacity, including efficiently selecting capacity so as to minimize wasting of added capacity. If desired, a user review process is available by which users can review and approve the design. Once approved, the design is implemented automatically, including network verification, provisioning, order placement with the third party entities and activation of the revised network according to the new design.

While for purposes of simplicity of explanation, the respective processes are shown and described as a series of blocks in FIGS. 2B and 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram of a virtualized communication network 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and process 232 presented in FIGS. 1, 2A, 2B, 2C, and 3. For example, virtualized communication network 300 can facilitate in whole or in part identifying usage data in communication networks of the system virtualized communication network 300, identifying currently used capacity and available capacity in the communication network, and automatically improving or even optimizing network design to reconfigure network capacity or add additional network capacity. The design may be implemented automatically.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
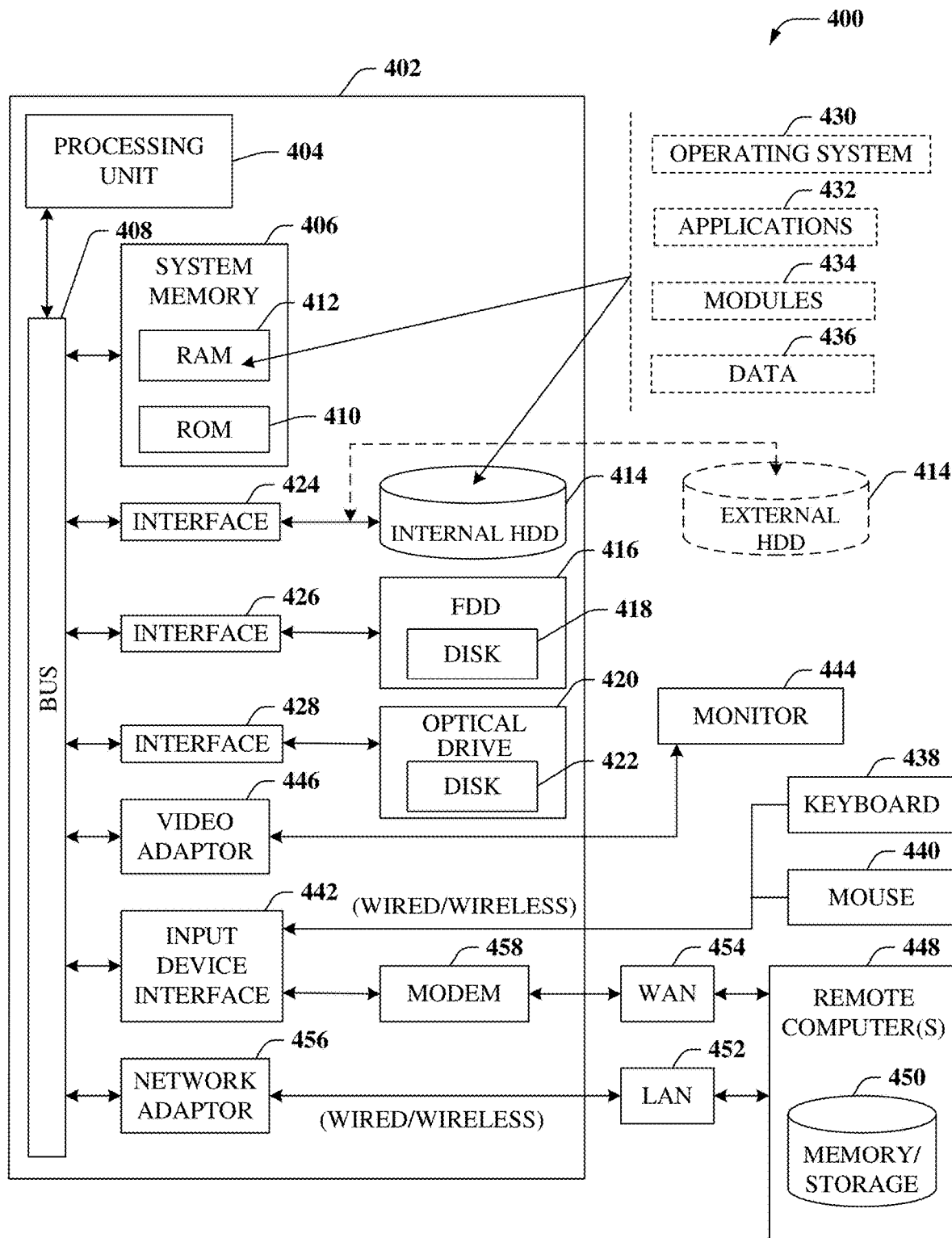
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part operations of the optimizer 256 or other components of system 250 of FIG. 2C, including identifying usage data in communication networks of the system, identifying currently used capacity and available capacity in the communication networks, and automatically improving or optimizing network design to reconfigure network capacity or add additional network capacity.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
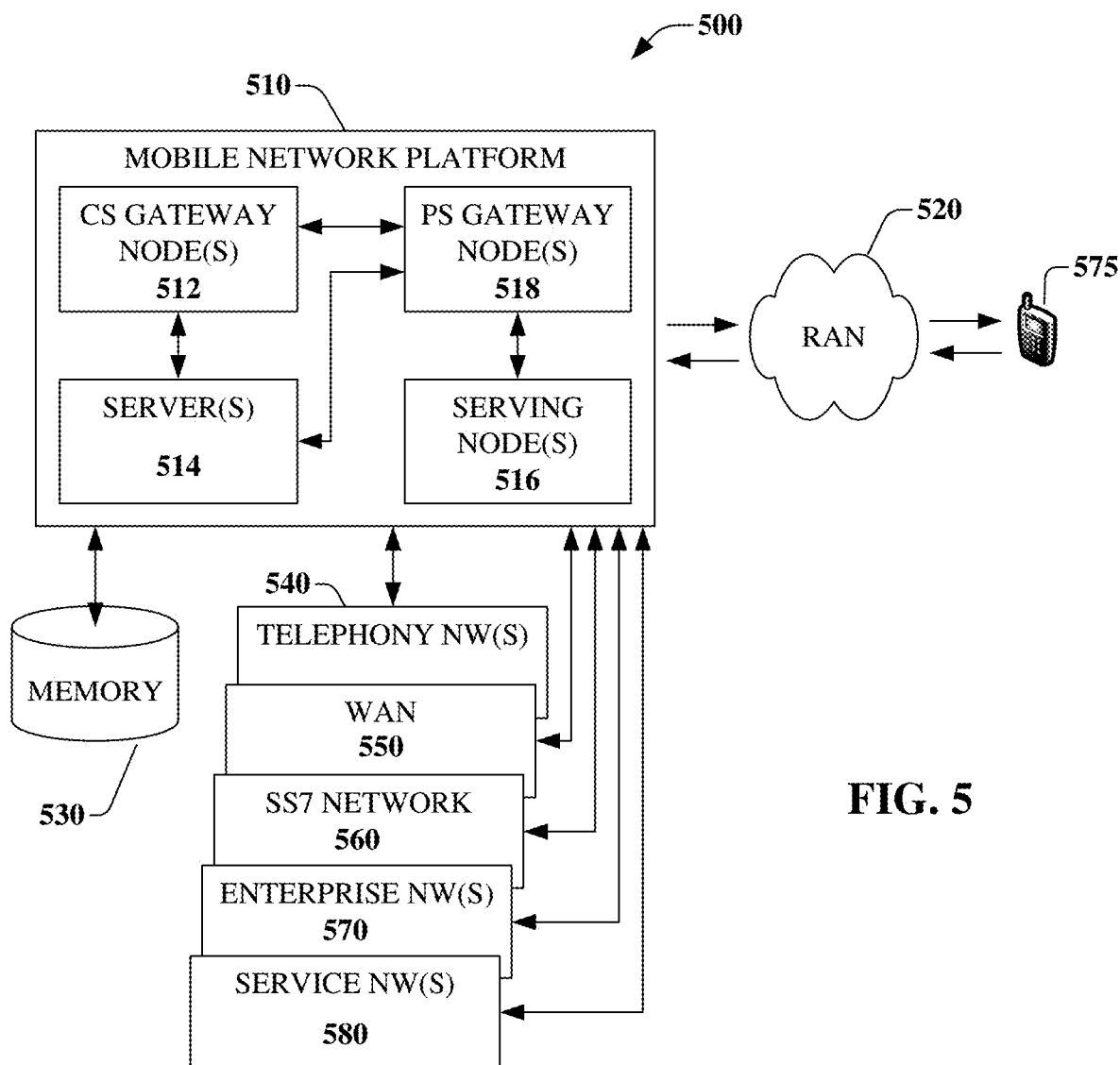
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part operations of components of system 250 of FIG. 2C, including identifying usage data in communication networks of the system, identifying currently used capacity and available capacity in the communication networks, and automatically improving or even optimizing network design to reconfigure network capacity or add additional network capacity. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
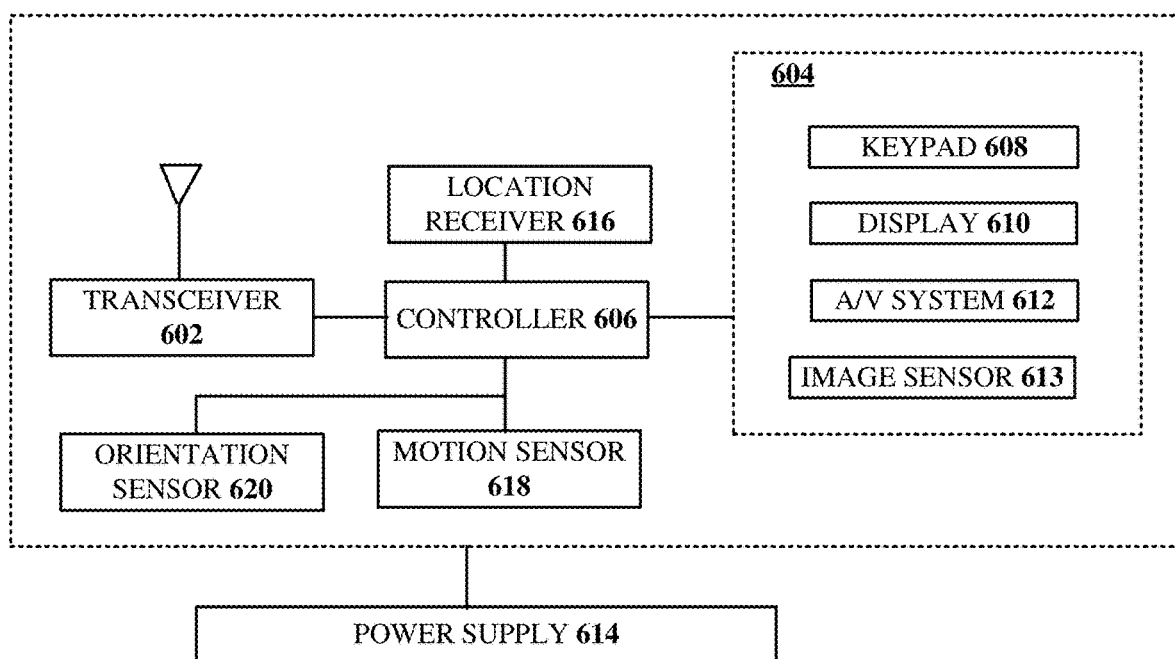
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part operations of the optimizer 256 or other components of system 250 of FIG. 2C, including identifying usage data in communication networks of the system, identifying currently used capacity and available capacity in the communication networks, and automatically improving and optimizing network design to reconfigure network capacity or add additional network capacity.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=confidence$ (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
    monitoring, by a processing system including a processor, communication traffic in a communication network over a time period, wherein the communication network includes a plurality of cell sites of a mobility network operator and a plurality of collector circuits, the plurality of collector circuits providing data communication between the communication network and a core network of the mobility network operator;
    storing, by the processing system, information about the communication traffic and information about available network resources in a database;
    predicting, by the processing system, where additional capacity will be needed in the communication network at a future time, wherein the predicting is based on the information about the communication traffic;
    improving, by the processing system, assignment of additional capacity in the communication network between the plurality of cell sites and the plurality of collector circuits, wherein the improving is based on the information about available network resources and wherein the improving comprises assigning to the communication network two or more available connections between the plurality of cell sites and the plurality of collector circuits, the two or more available connections including at least one leased third-party connection and at least one owned connection of the mobility network operator; and
    communicating, by the processing system, with network switches to assign the additional capacity within the communication network and initiate communication in the communication network.

2. The method of claim 1, wherein the monitoring communication traffic comprises:
    collecting, by the processing system, usage data for one or more components of the communication network.

3. The method of claim 2, wherein the collecting usage data comprises:
    collecting, by the processing system, information about volume and duration of calls, handover frequency and data access on the communication network; and
    collecting, by the processing system, information about call failure information or information about when the network was unavailable.

4. The method of claim 1, wherein the improving assignment of additional capacity comprises optimizing, by the processing system, network capacity based on a current capacity of the communication network and current and anticipated demand for capacity of the communication network.

5. The method of claim 4, wherein the improving network capacity comprises optimizing, by the processing system, capacity based on relative availability of added capacity and relative cost of added capacity.

6. The method of claim 4, wherein the improving network capacity comprises:
    receiving, by the processing system, a policy defining a plurality of constraints, the plurality of constraints including information about the at least one leased third-party connection, and wherein the optimizing assignment of additional capacity comprises optimizing selection of components of the communication network and interconnection of the components of the communication network according to the plurality of constraints;
    providing, by the processing system, information about the selection of components of the communication network and interconnection of the components of the communication network to a user interface for review by a user;
    subsequently, receiving, by the processing system, from the user, an updated policy defining a modification by the user to at least one of the plurality of constraints;
    optimizing, by the processing system, the selection of the components of the communication network and interconnection of the components of the communication network based on the modification to the at least one of the plurality of constraints; and
    providing, by the processing system, updated information about the selection of components of the communication network and interconnection of the components of the communication network to the user interface for review by the user.

7. The method of claim 6, wherein the improving network capacity comprises:
    jointly optimizing, by the processing system, the plurality of constraints for a subset of collector circuits of the plurality of collector circuits.

8. The method of claim 7, wherein the communication network comprises a backhaul network configured to convey communication traffic between the plurality of cell sites and a plurality of collector circuits.

9. The method of claim 1, further comprising:
receiving, by the processing system, a request for a new design, wherein the receiving a request comprises receiving information about an existing backhaul network and receiving information about where in the communication network the additional capacity will be needed.

10. The method of claim 9, wherein the receiving information about an existing backhaul network comprises receiving, by the processing system, information specifying how much capacity of the existing backhaul network is currently in use and how much capacity of the existing backhaul network comprises spare capacity.

11. The method of claim 1, further comprising:
developing, by the processing system, a new design for the communication network; and
providing, by the processing system, the new design for the communication network to a user interface for review by a user.

12. The method of claim 11, further comprising:
receiving, by the processing system, approval of the new design from the user; and
initiating, by the processing system, provisioning of the new design in the communication network.

13. A device, comprising:
a processing system including a processor; and
a memory that stores executable instructions that, when executed by the processing system, facilitate performance of operations, the operations comprising:
receiving usage data for a communications network, wherein the communications network comprises a plurality of integrated access devices in data communication with one or more radio access networks of a mobile network operator and a backhaul network in data communication over a plurality of collector circuits with a core network of the mobile network operator, wherein the usage data includes information about current data usage in connections of the communication network, the connections including a combination of owned connections operated by the mobile network operator and leased third-party connections operated by others than the mobile network operator;
storing the usage data in a database for access by the processing system;
receiving current capacity data for the backhaul network, the current capacity data including information about available capacity in the owned connections and available capacity in the leased third-party connections;
storing the current capacity data in the database for access by the processing system;
determining, based on the usage data and the current capacity data, requirements for new capacity in the backhaul network;
retrieving, from the database, a plurality of constraints for the backhaul network, the plurality of constraints including information about the leased third-party connections;
increasing capacity in the backhaul network to satisfy the plurality of constraints, wherein the increasing capacity comprises developing a new design for the backhaul network, new design including a new combination of owned connections and leased third-party connections;
provisioning the new design, wherein the provisioning comprises designating connections and equipment of the backhaul network; and
initiating communication on the backhaul network using the new design.

14. The device of claim 13, wherein the operations further comprise:
receiving a request to develop the new design, wherein the receiving the request comprises:
receiving network relevant information including information about current network topology and interworking for the backhaul network;
receiving information about network locations where an increase in backhaul capacity is required; and
receiving information about an increase amount of backhaul capacity required.

15. The device of claim 13, wherein the operations further comprise:
providing, to a user interface device, design review information for access by a user; and
receiving, from the user, approval of the new design.

16. The device of claim 13, wherein the increasing capacity in the backhaul network to satisfy the plurality of constraints comprises determining a most efficient usage of the capacity in the backhaul network according to the plurality of constraints.

17. A non-transitory, machine-readable medium, comprising executable instructions that, when executed by a processing system including a processor, facilitate performance of operations, the operations comprising:
receiving usage data about network traffic in a communications network, wherein the communications network comprises a cellular communication network operated by a mobile network operator, a core network of the mobile network operator, and a backhaul network communicatively coupled with the cellular communication network and the core network;
storing the usage data in a database system accessible by the processing system, wherein the communication network includes a combination of owned connections operated by the mobile network operator and leased third-party connections operated by others than the mobile network operator, wherein the usage data includes information about current data usage in the owned connections and the leased third-party connections of the communication network;
receiving capacity data for the backhaul network, wherein receiving the capacity data comprises receiving current capacity data and available capacity data for the backhaul network wherein the current capacity data includes information about available capacity in the owned connections and information about available capacity in the leased third-party connections;
receiving, from the database system, data defining a plurality of constraints, wherein the plurality of constraints include information about communication capacity in the leased third-party connections;
increasing capacity in the backhaul network according to the plurality of constraints and the usage data, wherein the increasing capacity comprises modifying design of the backhaul network to accommodate the usage data to develop a new design for the backhaul network, wherein the modifying the design of the backhaul network comprises selecting a new combination of owned connections operated by the mobile network operator and leased third-party connections;
communicating information about the new design for the backhaul network according to the increased capacity to the leased third-party connections; and initiating communication between the cellular communication network, the core network and the backhaul network according to the new design for the backhaul network.

18. The non-transitory, machine-readable medium of claim 17, wherein the receiving usage data comprises receiving information about volume and duration of voice calls in the cellular communication network, handover frequency among base stations in the cellular communication network and data call access in the cellular communication network.

19. The non-transitory, machine-readable medium of claim 17, wherein the receiving usage data comprises receiving call failure information or information about when the cellular communication network was unavailable.

20. The non-transitory, machine-readable medium of claim 17, wherein the operations further comprise:
provide, to a user interface device, design review information about the new design for access by a user; and
receiving, from the user interface device, approval of the new design.

* * * * *